United States Patent
Nati, Jr.

[11] Patent Number: 5,898,485
[45] Date of Patent: Apr. 27, 1999

[54] METHOD AND APPARATUS FOR MULTIPLE TARGET RANGING

[75] Inventor: Salvatore F. Nati, Jr., Dexter, Mich.

[73] Assignee: IMRA America, Inc., Ann Arbor, Mich.

[21] Appl. No.: 08/897,157

[22] Filed: Jul. 18, 1997

Related U.S. Application Data

[63] Continuation of application No. 08/415,211, Mar. 31, 1995, abandoned.

[51] Int. Cl.⁶ .................................................. G01C 3/08
[52] U.S. Cl. ........................................ 356/5.08; 356/5.07
[58] Field of Search ................................ 356/5.07, 5.08

[56] References Cited

U.S. PATENT DOCUMENTS

| | | | |
|---|---|---|---|
| 3,409,368 | 11/1968 | Fernandez | 356/5.08 |
| 3,619,038 | 11/1971 | Hewlett | 356/5.12 |
| 3,752,581 | 8/1973 | Everest et al. | |
| 3,941,483 | 3/1976 | Ferrin | |
| 4,477,184 | 10/1984 | Endo | 356/141 |
| 4,613,231 | 9/1986 | Wichmann | 356/5 |
| 4,615,617 | 10/1986 | Frank et al. | 356/5 |
| 4,620,788 | 11/1986 | Giger | 356/5 |
| 4,651,647 | 3/1987 | Baker | 102/213 |
| 4,699,507 | 10/1987 | Etoh | |
| 5,243,553 | 9/1993 | Flockencier | 356/5 |
| 5,262,837 | 11/1993 | Shyy | 356/5 |
| 5,353,228 | 10/1994 | Geiss et al. | 364/458 |
| 5,357,331 | 10/1994 | Flockencier | 356/5 |
| 5,359,404 | 10/1994 | Dunne | 356/5 |

*Primary Examiner*—Stephen C. Buczinski
*Attorney, Agent, or Firm*—Burns, Doane, Swecker & Mathis, LLP

[57] ABSTRACT

The present invention is directed to a method and apparatus for detecting reflected pulses from multiple targets in a field of view such that range to each target can be detected with high resolution, even when the targets are located over a relatively wide measurement range. Exemplary embodiments of the present invention can provide real-time acquisition of ranging data, and can be implemented in a practical cost-effective manner suitable for reconfiguration.

23 Claims, 10 Drawing Sheets

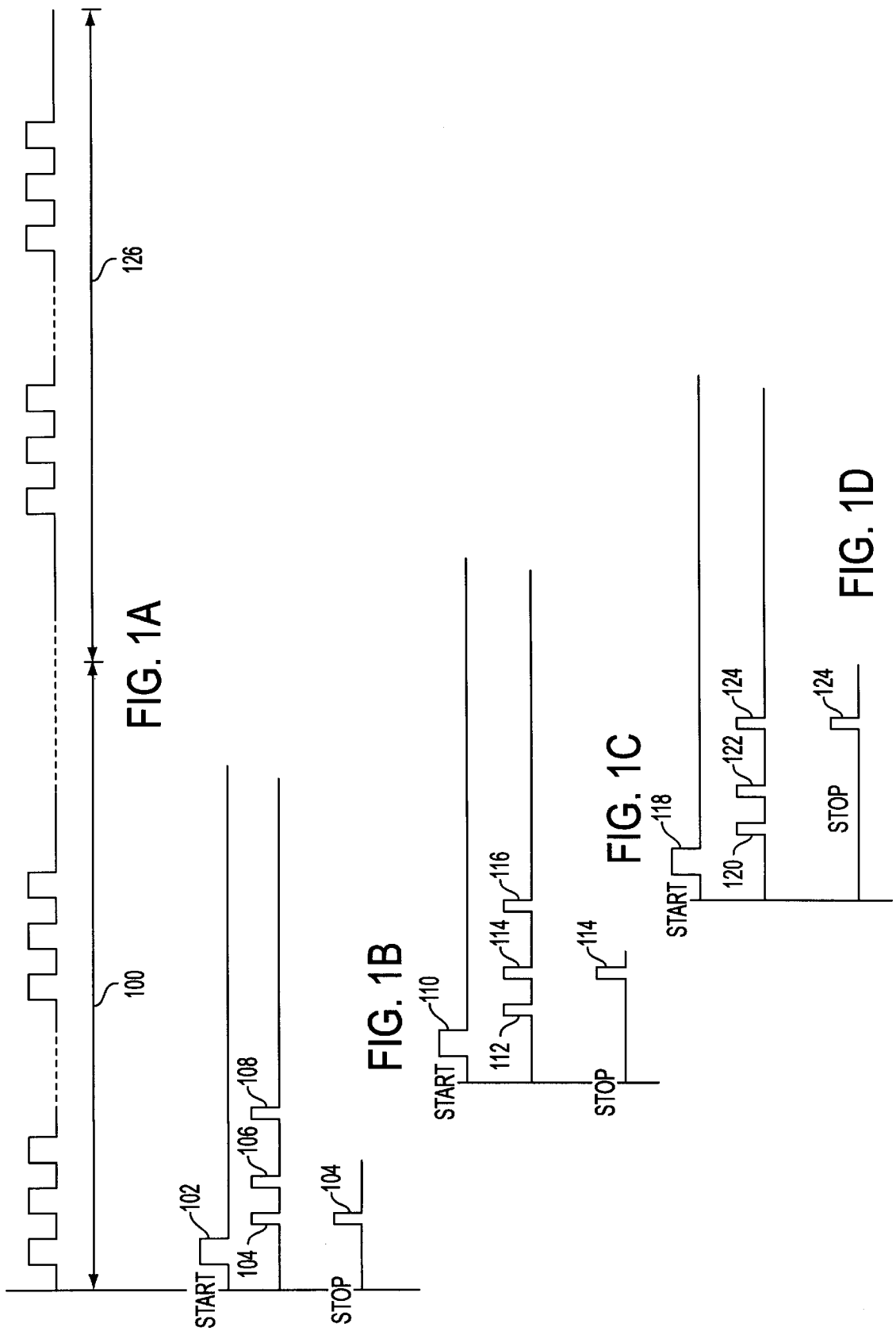

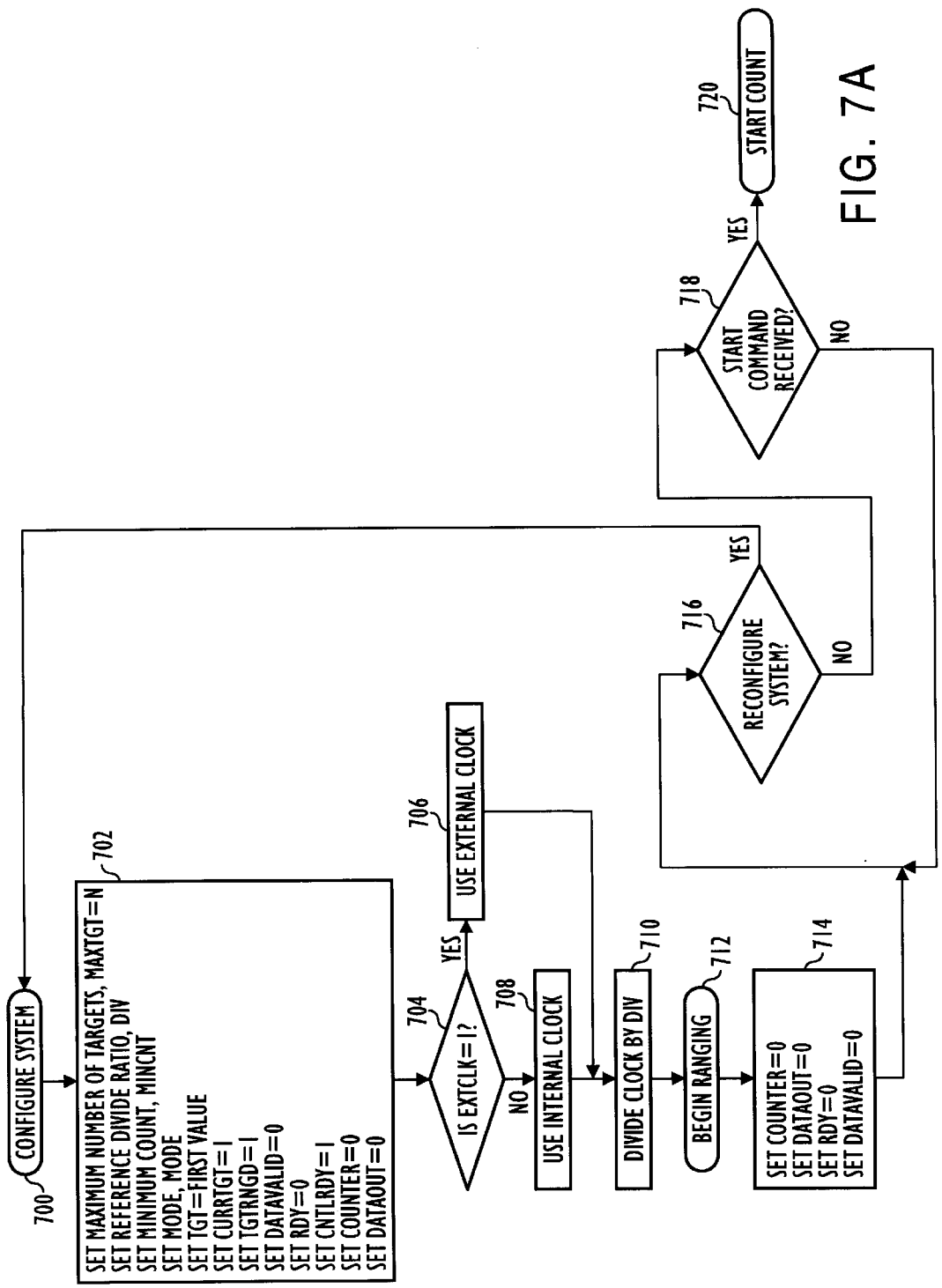

METHOD AND APPARATUS FOR MULTIPLE TARGET RANGING

This application is a continuation of application Ser. No. 08/415,211, filed Mar. 31, 1995 abandoned.

BACKGROUND OF THE INVENTION

1. Field of the Invention

The present invention relates generally to measuring a time delay of an event relative to a reference time for providing the range to a target. More particularly, the invention relates to a method and apparatus for measuring time delays between a reflected pulse from each of multiple targets relative to a reference pulse.

2. State of the Art

Devices for measuring a time delay using, for example, opto-electronic, electronic and ultrasonic range finders are known. Opto-electronic range finders, such as laser range finders, measure a time-of-flight of a transmitted laser pulse; that is, the time between transmission of the pulse and detection of a reflected laser return pulse from a target. To determine a time-of-flight of the transmitted laser pulse, a counter is typically started upon the emission of the laser pulse, and is then stopped upon receipt of the reflected pulse.

In addition, where multiple targets in the field of view are to be detected, devices have been developed to measure the time-of-flight to the additional targets. For example, a known opto-electronic range finder includes a counter which is started upon emission of a light pulse, and then stopped upon receipt of a reflected pulse. Once the counter has been stopped, the count information is transferred from the counter to an intermediate storage location. The counter then continues to count until the next reflected pulse is received.

Despite an ability to detect multiple reflected pulses, such devices suffer significant drawbacks. For example, the range finder device must be capable of transferring data from the counter to the intermediate storage in a time interval which is less than the resolution of the counter. That is, data must be transferred to the intermediate storage within one clock cycle so that the counter output does not change state during the transfer of data. Any practical implementation of such a range finder therefore requires use of a synchronous counter. However, it is difficult to implement a synchronous counter with a data width of 8 bits or more, and with counter resolutions on the order of 500 picoseconds.

Another known opto-electronic range finding device includes multiple counters. Each of the counters is started upon the emission of a light pulse, and each counter is stopped in sequence as multiple reflected pulses are received. However, this device suffers the drawback of requiring multiple counters, each having a wide data width and high resolution. The large area and very high power dissipation required for the use of multiple counters limits the number of targets which can be detected in a practical embodiment.

U.S. Pat. No. 5,353,228 (Geiss et al) discloses another known apparatus for detecting a range to multiple targets in a field of view. This patent describes dividing a predetermined measurement cycle into multiple time intervals. A sequence of distances is associated with the round-trip transit time receivable within each time interval, and a digital memory is used to store the presence or absence of a target at each interval. A disadvantage of this device is that its maximum resolution is a function of the time required to write information to the digital memory. In addition, this device is limited to a measurement cycle which must detect the presence or absence of a reflected target pulse within every designated time interval. Consequently, when the number of time intervals in the measurement cycle is increased to improve range or resolution, the number of locations in the storage device must be increased linearly. For example, increasing the measurement cycle by a factor of two, requires an attendant increase in the size of the digital memory by a factor of two. Accordingly, this device is impractical when high resolution (that is, a short time interval) and/or a large measurement cycle are required. Further, because this device stores an entire history of reflected target pulses for a given measurement cycle before any information is read out to a signal evaluation device, it is unsuited for real-time operation.

Other conventional range finding devices are premised on the use of range gating, wherein a counter is enabled for only a small interval of time. For example, to locate a first target which is expected to be within ten meters from the transmitter, the counter is enabled to detect a reflected pulse within a period of time which corresponds to a distance of ten meters. If no target is detected within this range, then the counter is enabled to detect reflected pulses from a target within a range of 10–20 meters. This process continues for each gated range, until all designated ranges have been examined. A disadvantage of range gating is that an increase in resolution can significantly increase the time required to perform a single measurement cycle. For example, if each specified interval possesses one meter resolution, then a measurement sequence for a range of 2000 meters would require 2000 separate measurements. Such operation can be extremely timely, inefficient and unsuitable for real-time data acquisition.

U.S. Pat. No. 4,477,184 (Endo) discloses a range finding device which suffers drawbacks similar to those described with respect to range gating. Here, a scanning laser is used to detect targets across an entire field of view. To achieve high resolution, each segmented portion of the field of view is relatively small. Because the time required to scan the entire field of view increases in proportion to the resolution desired, the disclosed device is unsuitable for achieving high resolution in real-time.

Accordingly, it would be desirable to provide a method and apparatus for determining ranges to multiple targets, in real-time, using a system having high resolution over a large maximum range. In so doing, it would be desirable to provide a practical, cost-effective system which can be easily reconfigured by the user.

SUMMARY OF THE INVENTION

Exemplary embodiments of the present invention are directed to a method and apparatus for detecting reflected pulses from multiple targets in a field of view such that a range to each target can be detected with high resolution, even when the targets are located over a relatively large measurement range. Exemplary embodiments of the present invention can provide real-time acquisition of ranging data, and can be implemented in a practical cost-effective manner suitable for reconfiguration by the user.

In accordance with the present invention, a method and apparatus are disclosed for determining ranges to multiple targets. Exemplary embodiments comprise means for transmitting a pulse, means for receiving reflected pulses produced in response to said transmitted pulse; and means for determining a time delay between said transmitted pulse and a predetermined one of said reflected pulses. The determining means further includes a clock generator for producing clock pulses; a counter for counting said clock pulses; and means for controlling said counter by monitoring a number of said reflected pulses produced in response to said transmitted pulse and by disabling operation of said counter when a predetermined number of said reflected pulses has been received.

BRIEF DESCRIPTION OF THE DRAWINGS

The present invention can be further understood with reference to the following description and the appended drawings, wherein like elements are provided with the same reference numerals. In the drawings:

FIGS. 1A–1F illustrate exemplary timing diagrams showing reflected pulses from multiple targets in a field of view according to an exemplary embodiment of the present invention;

FIGS. 7A–7C illustrate a flow chart for exemplary operation of the target ranging device described with respect to FIGS. 1–6.

DETAILED DESCRIPTION OF THE PREFERRED EMBODIMENTS

Figure 1E:
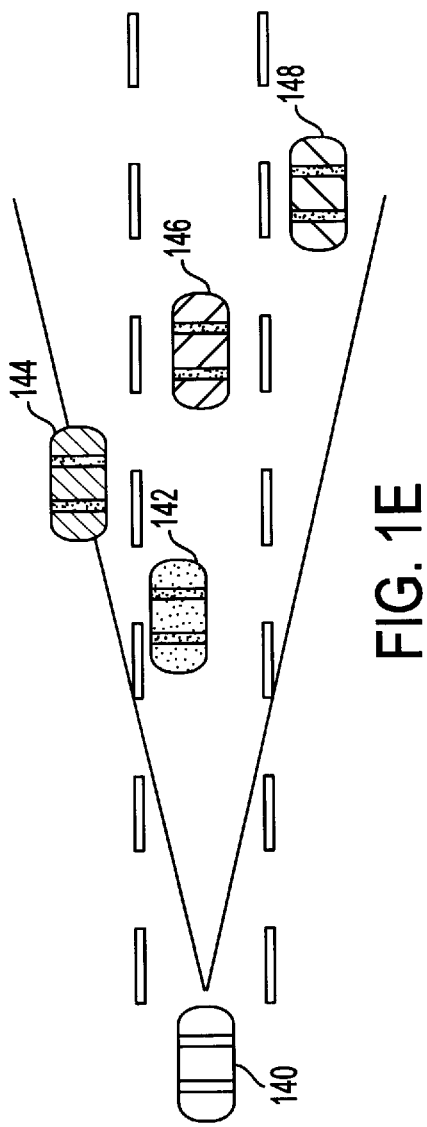
Figure 1F:
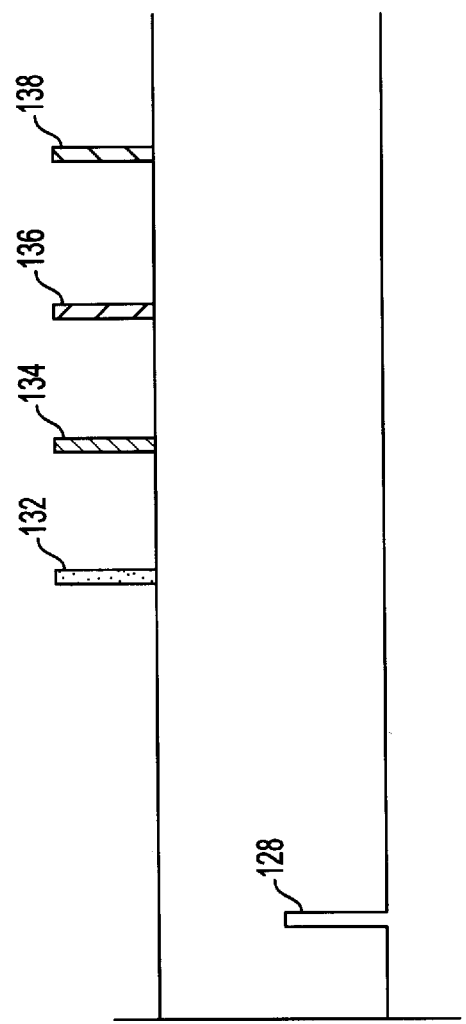

FIGS. 1A–1F illustrate exemplary timing diagrams for detecting reflected pulses of multiple targets in a field of view according to the present invention. To determine a range for multiple targets in the field of view, exemplary embodiments are initialized for the appropriate number of targets to be detected. Further, exemplary embodiments are initialized for the desired resolution, maximum target range, the order of target detection (that is, which target is to be detected first, which target is to be detected next, and so on) and the minimum detectable target range.

The number of pulses which are transmitted in a given ranging sequence, such as ranging sequence 100 of FIG. 1A, is equal to the maximum number "n" of targets to be detected. After initialization, a start command is issued which triggers emission of a reference pulse 102 (e.g., laser pulse) 102 and which enables a counter to begin counting. Once the laser pulse 102 has been transmitted, the receipt of reflected pulses from the targets is monitored. Where the closest target is to be detected first, the first reflected pulse 104 stops the counter. The count stored in the counter is then output to a control processor as a representation of range to the first target. In detecting the first reflected pulse 104, subsequently received pulses 106 and 108 are ignored.

After detecting range to the first target, the counter is reset and then a second start command 110 (FIG. 1C) of the first ranging sequence 100 is issued to detect range for the second target. Upon transmission of the second reference pulse 110, the counter is again enabled. However, the counter does not stop counting until the reflected pulse 114, representing the second target, is received and detected as illustrated in FIG. 1C. That is, the first reflected pulse 112 and a subsequent reflected pulse 116 are ignored such that the counter stores a count indicative of a distance to the target which reflected the second pulse 114.

The counter is then reset once again, and a third start command is issued to transmit a third start pulse 118 (FIG. 1D) of the ranging sequence 100. Because the first and second targets have already been previously detected, reflected pulses 120 and 122 are ignored. However, upon detection of the third reflected pulse 124, the counter is stopped such that the count stored therein represents range to the third target.

Once the nth start command has been issued and all targets in a given ranging sequence have been detected, the ranging sequence 100 is complete. A subsequent ranging sequence 126 can then be implemented, if desired. The ranging sequence 126 can repeat the ranging sequence 100, or can be reconfigured to, for example, detect any one or all of the targets with increased or reduced resolution.

FIG. 1E illustrates an exemplary use of this ranging operation for collision avoidance in a vehicle control environment, wherein potential targets include other vehicles. Using the operation described with respect to FIGS. 1A–1D, a reference pulse 128 is transmitted from the controlled vehicle 140. Reflected pulses 132, 134, 136 and 138 from the target vehicles 142, 144, 146 and 148, respectively are used to determine the range of each target vehicle from the controlled vehicle.

Exemplary embodiments of the present invention permit multiple targets to be determined without requiring multiple counters, or counters that transfer data to an intermediate storage location within one clock cycle. Further, exemplary embodiments eliminate any need for a large digital memory which stores information for each of a plurality of pre-designated time intervals.

Figure 2:
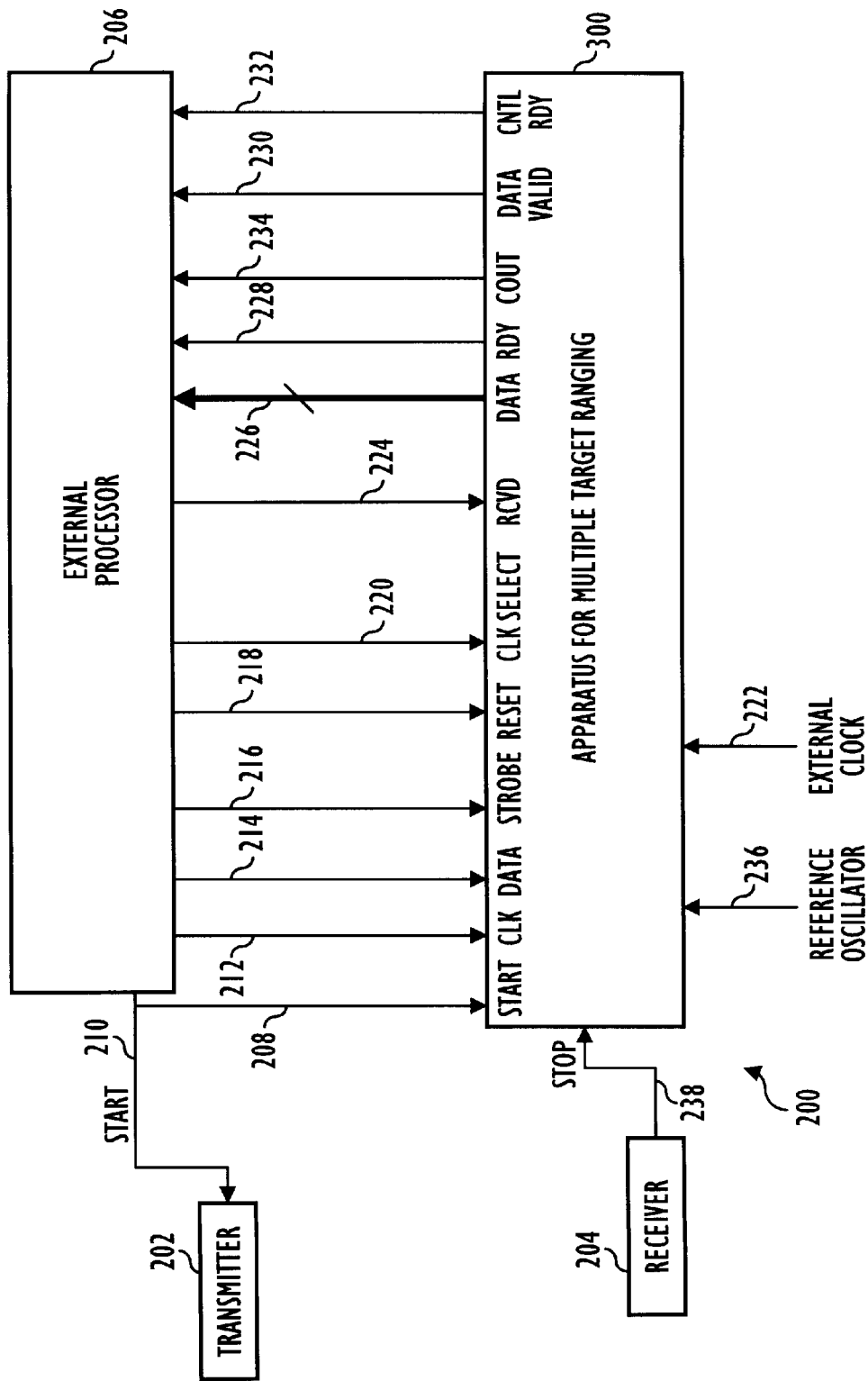
FIG. 2 illustrates a block diagram showing an exemplary embodiment of a range finding device in accordance with the present invention.

An exemplary embodiment of a device for implementing the ranging operation of FIGS. 1A–1F is illustrated in FIG. 2. In FIG. 2, a range finding device 200 constitutes an apparatus for determining the range to multiple targets. Range finding device 200 includes a means for transmitting a pulse, such as any conventional transmitter 202 for producing a laser pulse. A means for receiving reflected pulses produced in response to the transmitted pulse is represented as any conventional receiver 204. Means for determining a time between the transmitted pulse and a predetermined one of the reflected pulses includes a target ranging apparatus 300 for multiple target ranging. A processor which is either included within the target ranging apparatus 300 or which is external to the target ranging apparatus 300, such as external processor 206, supplies control information to the range finding device 200.

In accordance with exemplary embodiments, the external processor 206 can be a programmable gate array. However, those skilled in the art will appreciate that any conventional microprocessor can also be used to control operation.

To initiate a ranging operation, the external processor 206 issues a start command to the target ranging apparatus 300 via start signal line 208. This start command is also supplied to the transmitter 202 via start signal line 210 to initiate reference pulse transmission. Reflected pulses which are detected by the receiver 204 are used to supply signals to the target ranging apparatus 300 via a reflected pulse signal line 238. The reflected pulses are used to generate a counter stop signal.

The external processor 206 also communicates with the target ranging apparatus over a number of additional signal lines, such as clock and data signal lines 212 and 214, respectively. The clock signal line 212 is used to load data via the data signal line 214 into target ranging apparatus 300 during initialization or reconfiguration of the range finding device 200.

The information which is included in the data supplied via the data signal line 214 includes user configurable variables such as: (1) the maximum number of targets for a given ranging operation (MAXTGT); (2) a divide ratio reference value (DIV) for programming a timing interval that defines a minimum resolution and maximum range of the range finding device 200; (3) a minimum count used to disable a "stop counter" command until a specified count has been reached (MINCNT); (4) a mode command (MODE) used to distinguish a cascade mode (wherein one or more external counters are cascaded to the carry-out of an internal counter in the target ranging apparatus 300 to extend the maximum range) from a non-cascaded mode; and (5) a target value (TGT) which represents the value of a target being searched (note that the user can configure the system to search for the targets in any order, such as closest to furthest, furthest to closest, and so forth).

The external processor 206 also sends a strobe signal via a strobe signal line 216 for verifying when data has been sent via the data signal line 214. A reset signal line 218 resets parameters of the target ranging apparatus 300. A clock select signal line 220 is used to designate whether a system clock signal will be generated from: (1) an internal clock in the target ranging apparatus 300; or (2) an external clock received by the target ranging apparatus 300 via an external clock signal line 222. The internal clock of the target ranging apparatus 300 is driven in response to a reference oscillator input 236.

A data received signal line 224 is used by the processor 206 to acknowledge when data has been received from the target ranging apparatus 300. For example, when valid data corresponding to the range of a target currently being searched (that is, valid ranging data) has been received and stored by the external processor 206, a "received" signal is sent to the target ranging apparatus 300.

The target ranging apparatus 300 also sends information to the processor 206 over a variety of signal lines. The valid ranging data acquired by the target ranging apparatus 300 is sent to the external processor via data signal lines 226. This data is read by the processor 206 upon receipt of a "ready" signal from the target ranging apparatus 300 via ready signal line 228 and a data valid signal on data valid signal line 230.

A control ready signal line 232 is used by the target ranging apparatus 300 to inform the processor 206 when the target ranging apparatus 300 is between ranging sequences; whenever the control ready signal is asserted, the range finding device 200 can be reconfigured by supplying it with new variables via data lines 214. Finally, a carry-out signal line 234 is used to inform the processor 206 when the internal counter of the target ranging apparatus 300 has reached its maximum count value; the carry-out signal thus informs the processor 206 that no target has been detected for a given interval of the ranging sequence.

Features of the target ranging apparatus 300 will now be described in greater detail with respect to FIG. 3. As illustrated in the exemplary FIG. 3 embodiment, the target ranging apparatus 300 receives a two bit differential input via start signal line 208 and receives a two bit differential stop signal from the receiver 204 via the reflected pulse signal line 238. For each of the start and stop signals, the two bits constitute inverted and non-inverted start/stop signals.

The inverted and non-inverted signals for each of the start and stop signals can be supplied to a buffer for comparison to improve edge detection in known fashion. However, those skilled in the art will appreciate that a single line can be used for each of the start and stop signals if desired.

The start and stop signal are supplied to a counter controller means 302, represented as a timing and control block 404. The timing and control block 404 also receives the initialization and reconfiguration data via clock signal line 212, data signal line 214 and strobe signal line 216.

Figure 3:
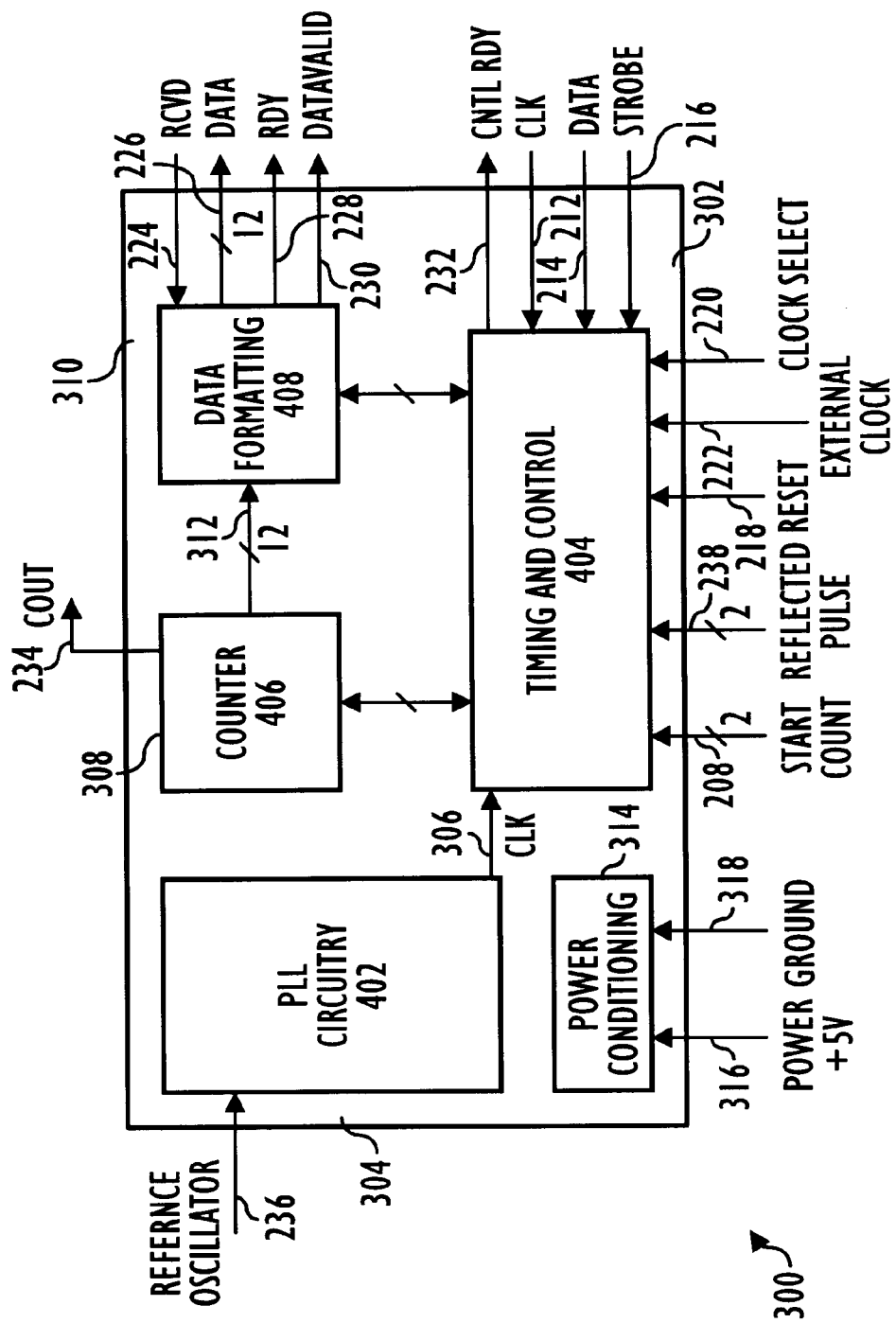
FIG. 3 illustrates a block diagram showing an exemplary embodiment of the apparatus for multiple target ranging shown in FIG. 2.

As illustrated in FIG. 3, the timing and control block 404 receives the reset signal line 218, the clock select signal line 220 and the external clock signal line 222. The clock select line 220 signifies whether an external clock signal supplied via external clock signal line 222 is to be used, or whether an internal clock driven by the reference oscillator input 236 is to be used to provide a system clock signal. In accordance with exemplary embodiments, a system clock signal on the order of 2 gigahertz can be used. However, those skilled in the art will appreciate that a clock frequency which is any order of magnitude less than or greater than 2 gigahertz can be used provided logic errors do not occur in processing the counter data.

A clock pulse generating means 304, represented as phase lock loop circuitry 402, produces the internal clock signal on internal clock signal line 306 in response to the reference oscillator input 236. In accordance with exemplary embodiments, the reference oscillator can be a relatively slow speed oscillator which produces pulses with a frequency on the order of 25 megahertz.

Outputs from the timing and control block 404 are supplied to a means 308 for counting the clock pulses, represented as a counter 406. In the exemplary FIG. 3 embodiment, the counter 406 is a 12-bit counter. However, those skilled in the art will appreciate that a counter having any number of bits can be used. A 12-bit output from the counter is supplied via counter output signal lines 312. Further, the counter supplies a carry-out signal on the carry-out signal line 234.

The 12-bit counter output, along with outputs from the timing and control block 404, are supplied to a means 310 for formatting data, represented as data formatting block 408. The data formatting block 408 ensures that a continuously changing count value on the counter output signal lines 312 is not supplied to the data signal lines 226 of the target ranging apparatus 300. The data formatting block 408 only supplies the count value of the counter 406 to the data signal lines 226 when a counter stop command has been generated by the timing and control block 404 in response to reflected pulses on the reflected pulse signal line 238.

When valid data has been supplied to the data signal lines 226, a ready signal is applied to ready signal line 228 and a data valid signal is supplied to data valid signal line 230. These signals, as well as any other signals between the target ranging apparatus 300 and the external processor 206, can be supplied by the timing and control block 404 to the external processor 206 via the data formatting block 408.

Power for the target ranging apparatus 300 is supplied via a power conditioning circuit 314. The power conditioning circuit 314 of the exemplary FIG. 3 embodiment, can include any conventional filtering, and receives power via an exemplary five volt power input 316 and a ground input 318.

Figure 4:
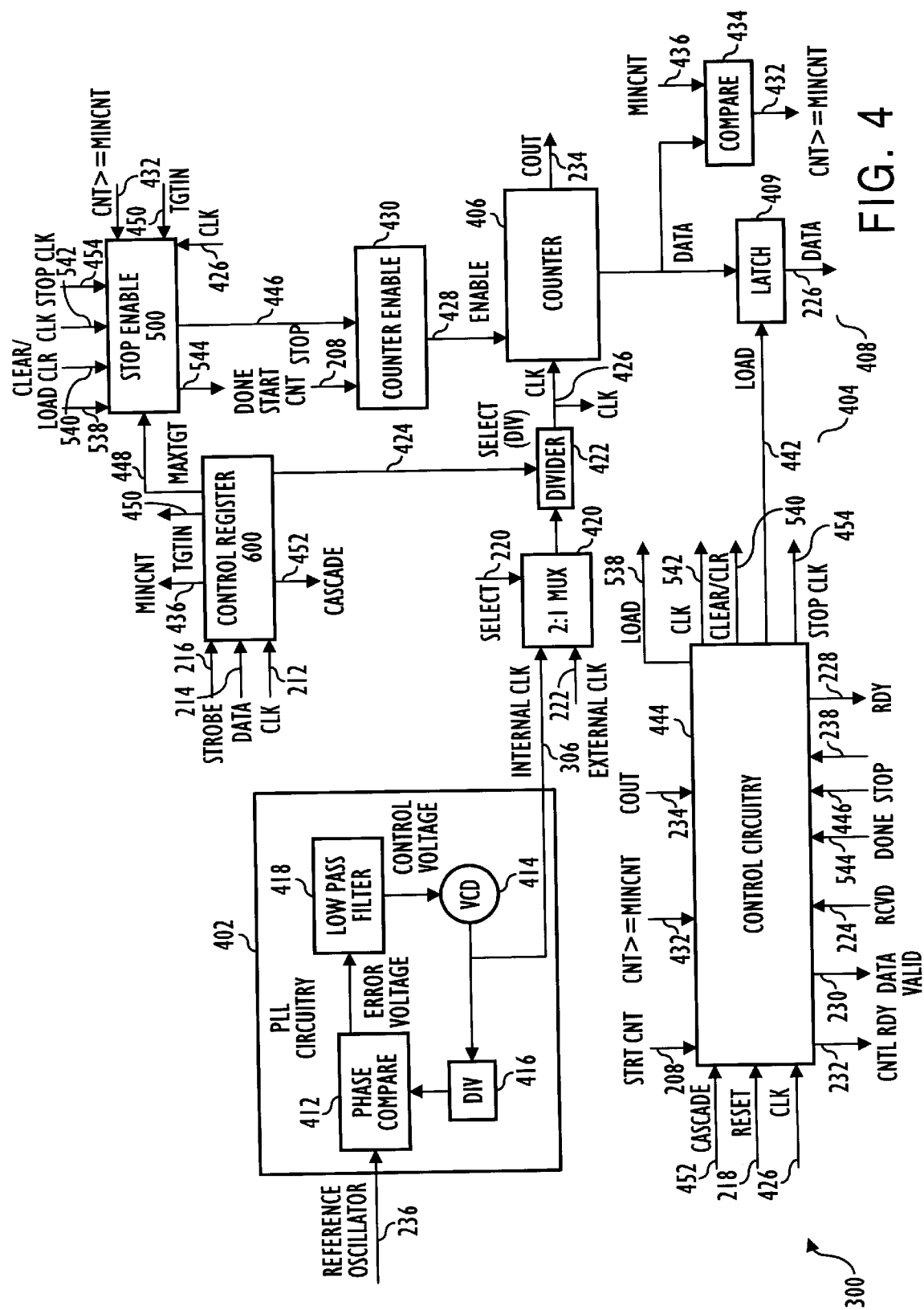
FIG. 4 illustrates a block diagram showing an exemplary embodiment of circuitry included in the FIG. 3 embodiment.

FIG. 4 illustrates features of the FIG. 3 target ranging apparatus 300 in greater detail. In FIG. 4, the phase lock loop circuitry 402 is illustrated as including a conventional phase comparator 412 which receives the reference oscillator input 236. A voltage controlled oscillator (VCO) 414 can, in accordance with exemplary embodiments, be a two gigahertz oscillator. The voltage controlled oscillator output can be divided via a clock divider 416 for comparison with the reference oscillator input in phase comparator 412. Phase errors between the reference oscillator input 236 and the voltage controlled oscillator 414 are supplied to a low pass filter 418 to adjust the output frequency of the voltage controlled oscillator 414 in conventional fashion.

The phase compensated output from the voltage controlled oscillator 414 is supplied via internal clock signal line 306 to a 2:1 multiplexer 420 of the timing and control block 404. The multiplexer 420 receives the clock select signal line 220. Depending on the state of the clock select signal line 220, either the internal clock signal produced by the phase lock loop circuitry 402 or the external clock received via the external clock signal line 220 is output from the multiplexer 420.

The selected output from multiplexer 420 is supplied to a clock signal divider 422. The divide ratio (DIV) of divider 422 is a user configurable variable which is stored in a control register 600 and supplied to divider 422 via divider select signal line 424. The divide ratio is used to modify the clock frequency of the system clock signal which drives counter 406, and thereby control a timing interval of the counter 406. Those skilled in the art will appreciate that by modifying the clock frequency, the resolution and range of the target ranging apparatus 300 can be controlled.

For example, by increasing the divide ratio, the clock frequency used to drive counter 406 will be reduced thereby reducing resolution of a given ranging sequence. However, by reducing resolution, the maximum range over which the counter 406 can detect a reflected pulse will be extended. In contrast, decreasing the divide ratio will increase resolution and decrease maximum range. In accordance with exemplary embodiments, the divide ratio can be set to any value, including values of 1, 2, 4 and 8.

The counter 406 is enabled, via an enable signal line 428, to count the divided clock pulses on the clock signal line 426. The enable signal is supplied from a means for enabling the counter operation, represented as a counter enable block 430. The counter enable block 430 receives the start command via the start signal line 208. Further, the counter enable block 430 receives a stop command, via stop count signal line 446, from a means for disabling counter operation, represented as stop enable block 500.

The start command is provided coincident with the transmission of the pulse from the FIG. 2 transmitter 202. The stop enable block 500 (FIG. 5) disables the counter operation via a stop command on stop count signal line 446 when a target currently be searched in a given ranging sequence has been detected, or when a ranging sequence is complete.

In an exemplary embodiment, the stop enable block 500 can be configured to sequentially generate stop commands for each target in a ranging sequence until the maximum number of targets have been ranged. For example, where the targets are to be detected from closest to furthest, the stop enable block 500 can monitor each detected target in the ranging sequence. A first stop command is generated when the first, closest target has been detected. After the counter 406 has been reset, the stop enable block 500 will generate the next stop command when a reflected pulse from the second target is detected. This process continues until all targets in a given ranging sequence have been detected.

The maximum number of targets to be detected in a given ranging sequence is supplied to the stop enable block 500 from the control register 600 via a maximum target signal line 448. The maximum target is loaded into a register (for example, a counter) of the stop enable block 500 in response to a load command signal on load command signal line 538.

A ranging clock signal is supplied to the stop enable block 500 via a ranging clock signal line 542. The ranging clock signal is used by the stop enable block 500 to keep track of the number of targets which have been ranged. A stop clock signal line 454 supplies reflected pulses (that is, reflected pulses which are received subsequent to the counter 406 reaching its minimum count) to the stop enable block 500. The stop clock signal is used by the stop enable block 500 to track the number of reflected pulses which have been received when ranging to a given target. The stop enable block 500 also receives the system clock signal line 426.

Prior to each ranging sequence, the stop enable block 500 is reset via a clear signal line 540. After all reflected pulses in a ranging sequence have been detected, the stop enable block 500 generates a done signal on a done signal line 544.

The load, clear/CLR and clock signals on signal lines 454, 538, 540 and 542 are supplied to the stop enable block 500 from control circuitry 444 of the timing and control block 404. Further, the done signal which signifies the end of a ranging sequence is supplied via the done signal line 544 to the control circuitry 444.

Recall that the data signal line 214 (FIG. 2) can be used to supply a target value (TGT) representing a target to be searched during a ranging sequence. Where the user has input a target value via the data signal lines 214 to the control register 600, this target value can be supplied to the stop enable block 500 via a target value signal line 450.

The control circuitry 444 of FIG. 4 will now be discussed in greater detail. The control circuitry 444 receives an input via a filter control signal line 432. The filter control signal indicates when the count value of the counter 406 has exceeded a user specified minimum count value. The filter control signal is used to generate the clock signal on stop clock signal line 454 of stop enable block 500, and thereby prevents the counter 406 from being stopped until after the minimum count has been reached. The filter control signal line 432 can also be supplied to the stop enable block 500 to ensure that the stop command is not supplied to counter 406 on stop count signal line 446 until after the counter 406 reaches its minimum specified value. Thus, the minimum count value is used as a noise filter; that is, it eliminates reflected signals which are received within a predetermined time period following transmission of the reference pulse from being considered a target reflected pulse.

To generate the filter control signal, the count value of counter 406 is supplied to a comparator 434. The comparator 434 also receives a minimum count value via signal line 436. the minimum count value is specified by the user and stored in the control register 600. Based on a comparison of its two inputs, the comparator 434 generates the filter control signal when the count value is equal to or greater than the minimum count value. Only when the filter control signal has been generated can the stop enable block 500 generate the stop command on stop count signal line 446. Thus, the use of a minimum count specified by the user avoids the false detection of objects nearer to the range finding device 200 than the first target to be detected.

The output from the counter 406 is also supplied to the data formatting means 408, which includes latch circuitry 409 of FIG. 4. The latch circuitry 409 ensures that only valid ranging data will be supplied to data signal lines 226 of the target ranging apparatus 300. The latch circuitry 409 is loaded in response to a load command signal 442, which is generated by control circuitry 444 of the timing and control block 406. The control circuitry 444 generates the load command signal when the counter 406 has been stopped, such that its count value represents valid ranging data.

The control circuitry 444 of FIG. 4 receives the start signal on start signal line 208 and the reflected pulses via the reflected pulse signal line 238. The control circuity 444 receives a start signal from the external processor 206 each time ranging to another target is initiated. The external processor 206 generates a start signal each time data is received from the target ranging apparatus 300, and additional targets of a ranging sequence are to be searched. Because the control circuitry 444 receives the output from the comparator 434 which indicates when the count of counter 406 is greater than the minimum count specified by the user, the control circuitry 444 can determine when the reflected pulses correspond to pulses reflected by a target (as opposed to spurious reflections from objects closer to the receiver than the first target to be detected). Based on this information, the control circuitry 444 can generate the ranging clock signal on ranging clock signal line 542 of stop enable block 500.

As illustrated in FIG. 4, the control circuitry also receives the cascade mode input signal on cascade signal line 452 from the control register 600. The cascade mode signal indicates whether the counter 406 is in a cascade mode. Further, the control circuitry 444 receives the reset signal on reset signal line 218, and the system clock signal on clock signal line 426.

The control circuitry 444 can receive the carry-out signal on carry-out signal line 234. The carry-out signal can be used by the control circuitry 444 to stop the counter 406 via stop enable block 500. Based on the value of the carryout signal, the control circuitry 444 can determine whether valid ranging data exists at the output of counter 406.

During a ranging sequence, the control circuitry 444 generates the control ready signal on signal line 232, the data valid signal on data valid signal line 230 and the ready signal on ready signal line 228. The control circuitry 444 receives the received signal from the external processor 206 via the received signal line 224. The control circuitry 444 also receives the stop signal on stop count signal line 446 and the done signal on done signal line 544 from stop enable block 500. The control circuitry 444 can use the stop signal to track when the most recently received reflected pulse, representing a currently detected target, corresponds with the target value currently being searched. The done signal can be used by the control circuitry 444 to track completion of a ranging sequence.

In response to these various signals, the control circuitry 444 generates the load signal for loading the maximum target value from the control register 600 into the stop enable block 500 at the start of each ranging sequence. The control circuitry 444 also generates the clear/CLR signal on clear/CLR signal line 540 after the ready signal has been output. The clear/CLR signal is used to reset the stop enable block 500 for a subsequent ranging sequence. Finally, the control circuitry 444 outputs the load signal to the latch 408 to supply data to the external processor 206 when valid data exists in the counter.

Figure 5:
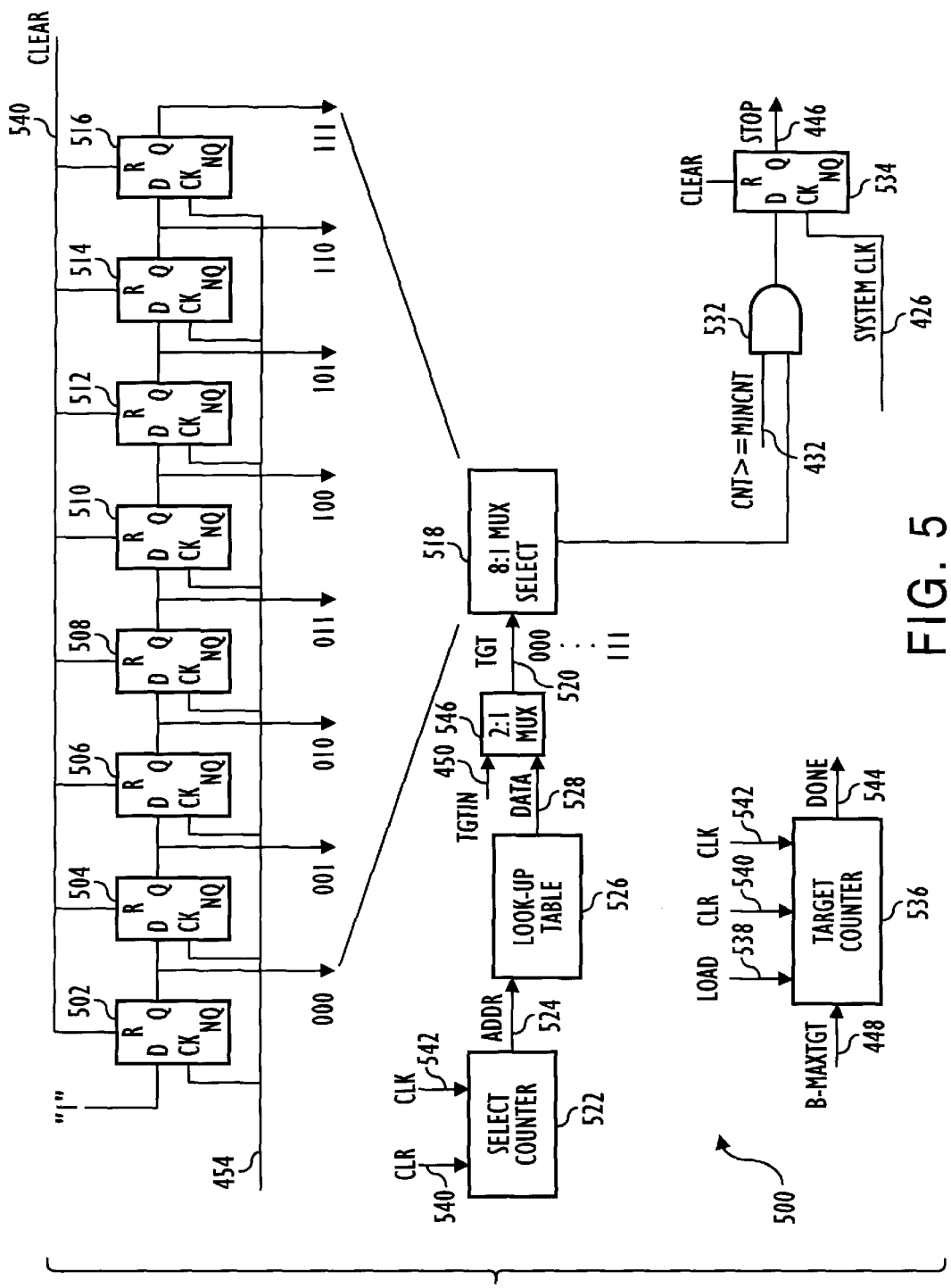
FIG. 5 illustrates a block diagram showing an exemplary embodiment of the stop enable block in FIG. 4 for disabling the counter.

An exemplary embodiment of the stop enable block 500 in FIG. 4 will now be described in greater detail with respect to FIG. 5. Referring to FIG. 5, the stop enable block 500 includes flip-flops 502, 504, 506, 508, 510, 512, 514 and 516 which collectively constitute a shift register. In the exemplary FIG. 5 embodiment, all of these flip flops are D flip-flops, the first of which receives a logic level high (represented as a "1") at its D input.

Reflected pulses from the receiver, received via stop clock signal line 454, are supplied as the clock signal to each of these flip-flops. As reflected pulses are received, a corresponding number of flip-flops will possess a logic level high at their Q outputs. For example, when 3 pulses have been received by the receiver, each of the flip-flops 502, 504 and 506 will possess a logic level high at their Q output.

By examining the Q output for a selected one of these flip-flops, it can be determined whether the reflected pulse corresponding to a given target has been received. For example, by monitoring when the Q output of the third flip-flop 506 transitions to a logic level high, it can be determined when the reflected pulse of the third target has been received.

By using a shift register as illustrated in FIG. 5, the stop enable block 500 can be configured to sequentially detect each target during a ranging sequence. The output from each flip-flop is supplied to an 8:1 multiplexer 518. By controlling a select signal line 520 of the multiplexer, the flip-flop outputs can be examined one at a time.

In the FIG. 5 embodiment, the select signal line 520 is a 3-bit value supplied from a 2:1 multiplexer 546. One input to the multiplexer 546 is a target signal line 450 representing a user specified number of a target currently being searched in a ranging sequence. Those skilled in the art will appreciate that the stop enable block 500 can be configured to produce a stop count signal in response to a user input specifying one or more targets of a given ranging sequence. As each different target in the ranging sequence is to be searched, the target value supplied by the user can be changed, thereby changing the 3-bit input on the target signal line 450.

For example, if the closest of eight maximum targets is being searched first, then the 3-bit value on the target signal line 450 can be set to 000. This 3-bit value can then changed as each subsequent target in the ranging operation is searched during subsequent ranging sequences (because the user can only select one target value in a ranging sequence according to an exemplary embodiment, a separate ranging sequence can be initiated to search each subsequent target). The order in which the targets are searched can therefore be specified by the user.

The stop enable block 500 is also configured to automatically sequence the select signal line 520 through one or more target values in a predetermined order during a ranging sequence. In an exemplary embodiment, the signal select line 520 can be automatically sequenced through a series of values using a select counter 522. The select counter 522 is driven by the ranging clock signal on ranging clock signal line 542. This clock signal produces a pulse each time the search for a new target in a ranging sequence is initiated. As each target in a ranging sequence is searched, the output from the select counter 522 changes. The select counter 552 also receives the system reset signal CLR via the clear/CLR signal line 540 each time a new ranging sequence is initiated.

Those skilled in the art will appreciate that the output of select counter 522 can be used to directly supply a sequence of values to the multiplexer 518 via the select signal line 520. However, to enhance flexibility of the stop enable block 500, the select counter output is supplied via an address signal line 524 to a look-up table 526. For the exemplary embodiment wherein a maximum of eight targets can be searched in a ranging sequence, a series of numbers from 0 to 8 can be stored in the look up table in any order. However, those skilled in the art will appreciate that the FIG. 5 embodiment can be modified to search any number of targets in a given ranging sequence.

The look-up table 526 can therefore be used to accommodate a ranging sequence wherein the targets are searched in a random order specified in advance by the user. For example, the look-up table 526 can be configured to accommodate a ranging sequence wherein every other target is searched; thus, as the select counter 522 is incremented, the look-up table 526 will sequentially gate the outputs from the flip-flops 504, 508, 512 and 516 through the multiplexer 518.

When a given target being searched has been located and detected, the Q output of an appropriate flip-flop transitions to a logic level high. This output is supplied via multiplexer 518 to an AND gate 532. The AND gate 532 ensures that the counter 406 (FIG. 4) has exceeded the minimum count value necessary for a stop count signal to be generated.

Only when the counter value exceeds the minimum count will the output of AND gate 532 be permitted to transition high to set a latching flip-flop 534. When a stop count signal is supplied via the multiplexer 518, and the counter count value exceeds the minimum count, a logic level high produced by the AND gate 532 is latched into D flip-flop 534 on the next system clock pulse. A counter stop signal is then supplied via the stop count signal line 446 to the counter enable block 430 of FIG. 4. The counter 406 will not be restarted until the search for the next target in the ranging sequence is initiated by the control circuitry 444. At that time, the flip-flop 534 is also cleared by the clear signal.

The stop enable block 500 as illustrated in FIG. 5 also includes a target counter 536. The target counter 536 can be loaded with the number of targets to be searched in a given ranging sequence. The load signal is supplied from the FIG. 4 control circuitry 444 via load signal line 538. The target counter 536 is thus loaded with the maximum number of targets to be searched in a given ranging sequence.

The target counter 536 is cleared via the same CLR signal on clear signal line 540 used to clear the select counter 522. The target counter 536 is clocked via ranging clock signal line 542 by the same ranging clock signal used for select counter 522.

In operation, at the start of a ranging sequence, the load signal on load signal line 538 goes high, thereby loading the maximum number of targets to be searched in the ranging sequence. With each reflected pulse which is received subsequent to the counter 406 reaching its minimum count, the target counter 536 is decremented. Once the target counter 536 has been decremented to zero, the done signal is produced on output signal line 544 to indicate to the control circuitry 444 that the current ranging sequence has been completed.

Figure 6:
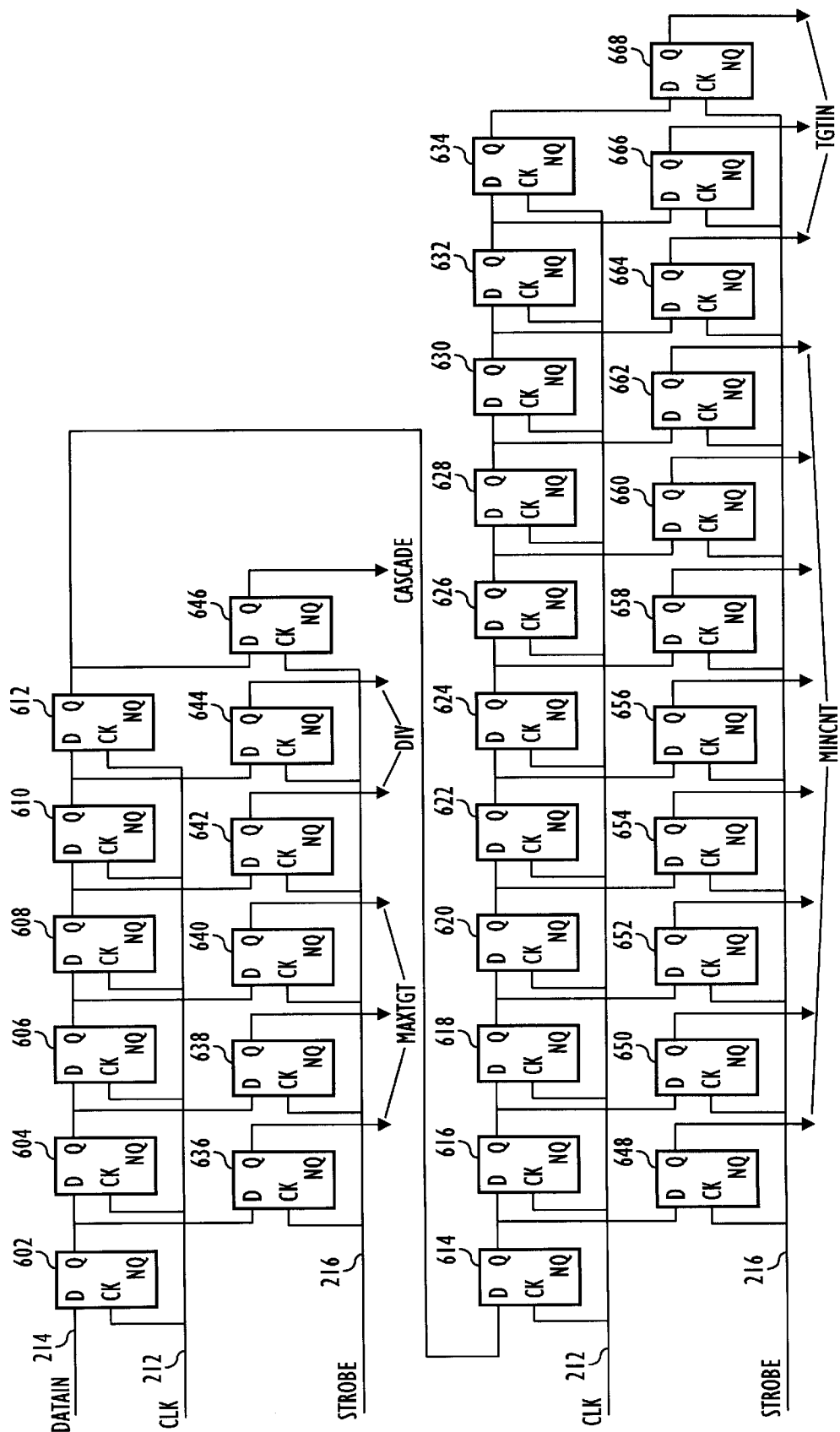
FIG. 6 illustrates a block diagram showing an exemplary embodiment of the FIG. 4 control register.

The control register 600 of FIG. 4 will now be described in greater detail with reference to FIG. 6. The exemplary embodiment of FIG. 6 shows a control register 600 which includes a plurality of D flip-flops. The control register 600 is sequentially loaded with the data from the processor 206, this data representing each of the user configurable variables. Once the control register 600 has been loaded with all user-configurable variables, a ranging operation can be initiated.

More particularly, in response to the clock signal on clock signal line 212, data specified by the user is supplied from the processor 206 to the flip-flops of control register 600. The user specified data includes values for the maximum number of targets to be searched in a given ranging sequence, the divide ratio, the cascade mode, the minimum count value and the target to be searched in a given ranging sequence. This data is serially input to flip-flops 602–634. Once all such data has been transferred from the processor 206 (FIG. 2) to the target ranging apparatus 300, the strobe signal is supplied by the processor 206 via strobe signal line 216. As a result, the user specified data is transferred from the flip-flops 602–634 (FIG. 6) into flip-flops 636–668 of the control register 600.

As illustrated in FIG. 6, the flip-flops 636, 638 and 640 store a 3-bit value representing the maximum number of targets being searched in a current ranging sequence, for input to the stop enable block 500 (FIG. 4). The flip-flops 642 and 644 of FIG. 6 store a 2-bit value representing the divide ratio of clock signal divider 422 (FIG. 4). The flip-flop 646 of FIG. 6 stores the cascade mode to inform the control circuitry 444 (FIG. 4) whether additional external counters have been cascaded to the carry-out of the counter 406 to extend the range of the target ranging device.

The flip-flops 648–662 of FIG. 6 store an 8-bit value representing the minimum count value supplied to the comparator 434 (FIG. 4). The flip-flops 664, 666 and 668 store a 3-bit value representing a particular target to be searched in a current ranging sequence; this value is supplied via the target signal line 450 (FIG. 5).

Figure 7B:
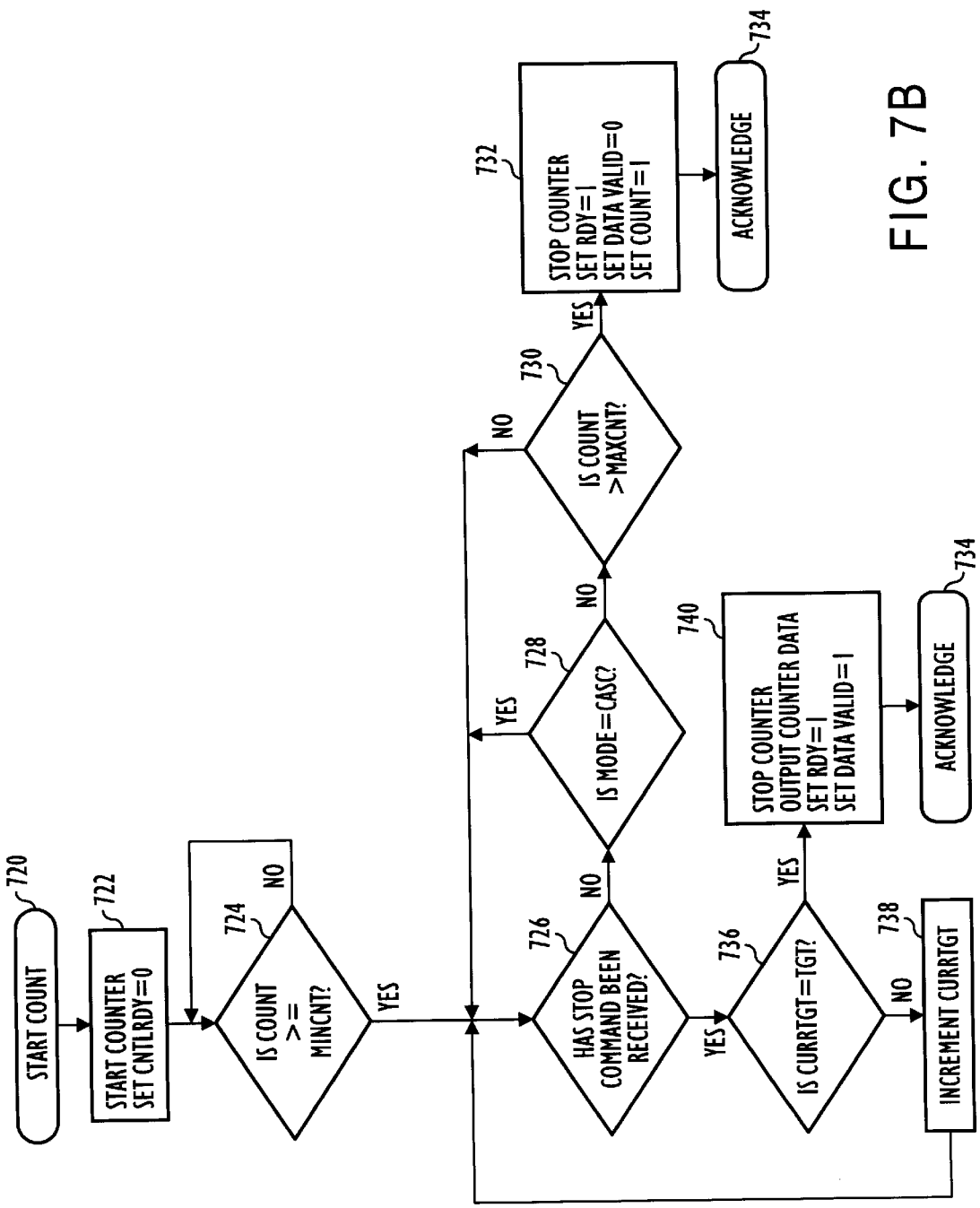

Having described an exemplary embodiment of a target ranging device 200 for multiple target range finding, operation of this exemplary embodiment, including operation of the control circuitry 444 (FIG. 4), will now be described with respect to the flow chart of FIGS. 7A–7D. As illustrated in FIG. 7A, system operation begins with user-configuring of the system as represented by block 700. The user specifies the maximum number of targets (MAXTGT), the divide ratio of the clock divider (DIV), the minimum count value (MINCNT), the cascade/non-cascade mode (MODE) and, if desired, a user specified target to be searched (TGT).

An initialization of the system in block 702 further includes initializing a target value to the first target which is to be searched. Where a specified target has been stored in the control register, the target value is initialized to correspond with the specified target. Otherwise, the target value is initialized to the first value stored in the look-up table 526 by clearing the select counter 522 (FIG. 5). A value representing the current number of targets which have been detected (CURRTGT) is initialized; the current target value is incremented as each target is detected until the current target value matches that of the target being searched. A value representing the number of targets which have been ranged (TGTRNGD) is also initialized in block 702; for example, after the three targets described with respect to FIGS. 1A–1D have been detected, the targets ranged value (TGTRNGD) is equal to 3.

The data valid, ready and control ready handshaking signals (that is, DATAVALID, RDY and CNTL RDY) are also initialized. The data valid signal, which is supplied from the target ranging apparatus 300 to the processor 206 when valid ranging data has been obtained (that is, when a stop command has been generated and the carry-out signal is false), is initialized false. The ready signal, which is supplied from the target ranging apparatus 300 to the processor 206 when data is available at the output of the target ranging apparatus 300 (that is, when a stop command has been generated in response to, for example, detection of a target or generation of the carry-out signal from counter having the most significant bits of the counter output), is also initialized false. The control ready signal, which is supplied by the target ranging apparatus 300 to the processor 206 when a ranging sequence has been completed, is initialized true. When a start command for a ranging sequence is received, the control ready signal becomes false to prohibit the user from reconfiguring the system until the current ranging sequence has been completed. As illustrated in the block 702, the counter 406 and the data signal lines 226 (FIG. 4) are also initialized to values of zero.

In block 704, the target ranging device 200 determines whether it has been configured to use its internal clock or whether an external clock has been supplied. If the clock select signal line has been set, the external clock is used as represented by block 706. If not, the internal clock is selected as represented by block 708. In accordance with exemplary embodiments, regardless of which clock is used, the clock signal is divided as represented by block 710 after which a target ranging operation is initiated in block 712.

Before determining the range to each target of a ranging sequence, the target ranging device reinitializes the counter, the data signal lines, the ready signal and the data valid signal. Recall that these values were initialized in block 702 prior to initiation of a ranging sequence, such that they need not be re-initialized in block 714 prior to ranging the first target in a ranging sequence. However, these values are re-initialized prior to ranging each subsequent target within the ranging sequence. Accordingly, once a target has been ranged, these values are re-initialized in block 714.

Before ranging each target, the user can be given the opportunity to reconfigure the target ranging device 200 as represented by the decision block 716. Alternately, the opportunity to reconfigure the target ranging device 200 can be restricted to the start of a ranging sequence by monitoring the control ready signal. If the user does wish to reconfigure the system and such an option is currently available, then operation is returns to the configuration blocks 700 and 702.

If the user does not choose to reconfigure the target ranging device 200, then the range finding device 200 awaits the input of a start command, represented by block 718, to initiate ranging of the first target in a ranging sequence. Once the start command has been received, the counter 406 begins counting as indicated in block 720.

Referring now to FIG. 7B, the counter 406 continues to count as indicated by block 722. During this time, the control ready signal is maintained false to indicate to the external processor 206 that a ranging sequence is currently being performed such that the target ranging device 200 can not be reconfigured.

During the ranging of a given target, decision block 724 reflects monitoring of the counter 406 to ensure that its count exceeds the specified minimum count. The use of a minimum count provides noise filtering of spurious reflections close to the transmitter.

Once the count has exceeded the minimum count for a given ranging operation, flow continues to the decision block 726 wherein monitoring for the stop command is performed. If a stop command has been received, a decision block 728 is implemented to determine whether a cascade mode has been selected or not. Recall that the cascade mode is used to extend the range of the counter 406. Accordingly, the cascade mode must be examined to take any cascaded counters into account when determining whether the maximum count has been detected in block 730.

If the maximum count is detected in block 730, then the carry-out signal is supplied from the counter 406 (or from an external counter if in the cascade mode), and operation of the counter is discontinued in block 732. An acknowledge operation represented by block 734 of FIG. 2C is then performed.

Returning to the decision block 726 of FIG. 7B, if a stop command is detected, then a decision block 736 examines whether the reflected pulse corresponds to the current target being searched. For example, if the current target being searched is the third target, and only a single reflected pulse has been received, then the current target value does not match the target value. The counter 406 therefore remains enabled, the current target value is incremented in block 738, and operation returns to the input of decision block 726 to continue monitoring for a stop command. Note that with the exemplary embodiment of the stop enable block 500 in FIG. 5, the stop command will not actually be generated until the current target value matches the value of the target being searched.

Once it is determined that the current target matches the target being searched, as represented in decision block 736, then the counter 406 is stopped in block 740. Data in the counter 406 is then output to the external processor 206, and the ready signal and data valid signal flags are set. Operation then flows to the acknowledge block 734 of FIG. 7C.

Figure 7C:
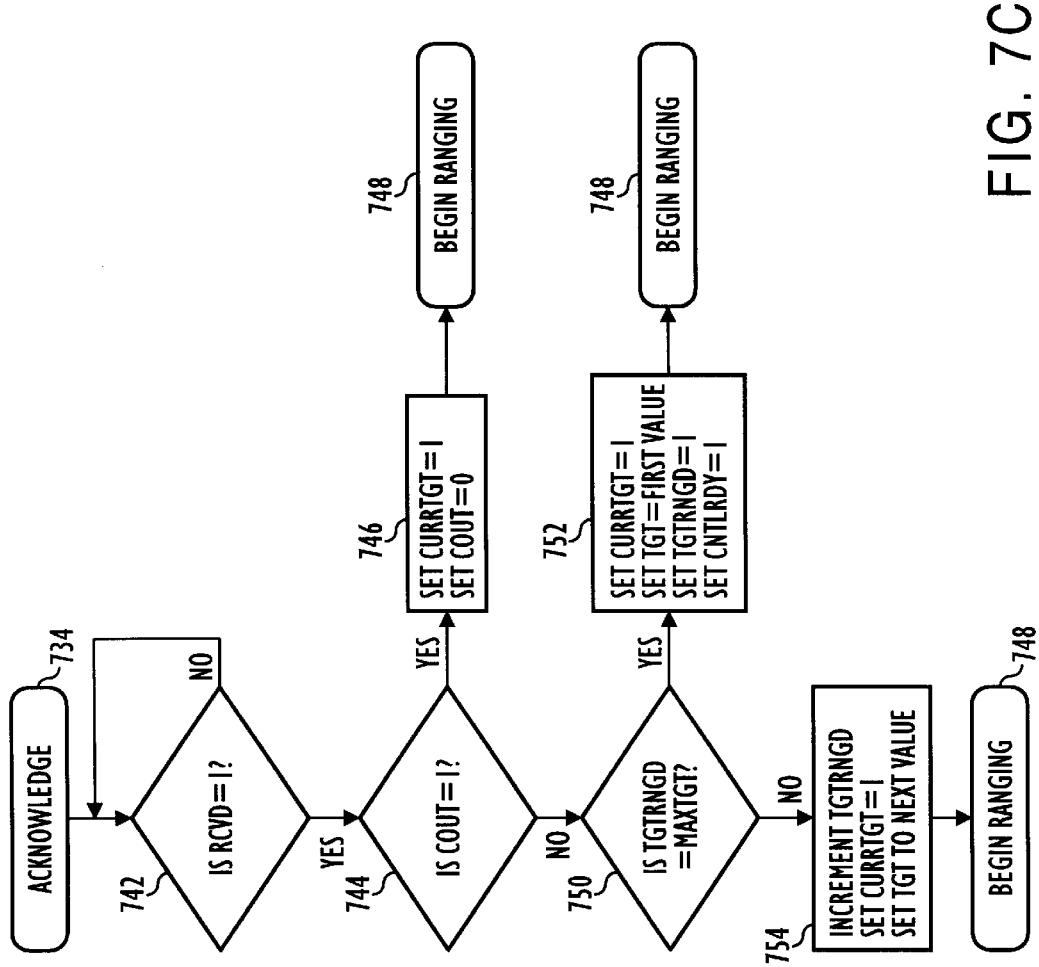

Referring to FIG. 7C, the acknowledge operation constitutes a verification by the processor 206 (FIG. 2) that valid data has been received. In decision block 742, the target ranging apparatus 300 examines whether the received signal line has set a flag to indicate that the external processor 206 received data.

Once the ready signal has been set, the processor 206 examines the carry-out of the counter 406 in block 744 to determine whether a counter overflow occurred. If so, the counter 406 has not detected a target range, such that the ranging must be reinitiated. Accordingly, in block 746, the target value is set to 1 and the carry-out signal is reset to 0. Note that the current target value is set to 1 so that when ranging is reinitiated a search will be performed for the second target in the ranging sequence. The subsequent ranging is initiated via block 748.

In contrast, if the carry-out is not detected in decision block 744, then a decision block 750 examines whether the number of targets ranged matches the maximum number of targets to be searched in the current ranging sequence. If not, the target ranged value is incremented in block 754, and the current target value reinitialized to 1. The current target to be searched in the ranging sequence is then incremented to the next value (for example, by incrementing the select counter 522 of FIG. 5), and ranging is reinitiated in block 748.

On the contrary, if the last target ranged does correspond to the maximum target in decision block 750, then the first ranging sequence is complete. In block 752, the variables associated with a ranging sequence are reinitialized so that a subsequent ranging sequence can be executed. As illustrated in block 752, the current target value is reset to 1, the target value is set to the first value, the targets ranged value is set to its initial value and the control ready signal is set to indicate that the system can be reconfigured by the user if desired. A subsequent ranging sequence can then be initiated in block 752 if desired.

Those skilled in the art will appreciate that the embodiment of a target ranging device 200 and associated operation, as illustrated in FIGS. 1–7, is by way of example only, and that any number of variations can be implemented. For example, any of the components described with respect to FIGS. 2–6 can be combined in any desired manner to provide the functions associated therewith. The illustration of a processor separated from the target ranging apparatus is by way of example only. Further, cascaded counters for implementing the cascade mode need not be formed external to the target ranging apparatus.

The control register 600 (FIG. 6) can be formed as any known storage device, including any desired number of user specified variables. The exact variables selected for inclusion in the control register 600, and the number of bits selected for representing each control variable is by way of example only. For example, the control register 600 can be modified to accommodate any number of specified targets.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for determining range to multiple desired targets comprising:
   means for transmitting a pulse to said multiple desired targets in a field of view;
   means for receiving reflected pulses produced by said multiple targets in response to said transmitted pulse; and
   means for determining a time between said transmitted pulse and any one of said reflected pulses, said determining means further including:
   means for generating clock pulses;
   means for counting said clock pulses; and
   means for counting said clock pulses; and
   means for controlling said counting means by clocking a shift register with said reflected pulses produced from said multiple targets in response to said transmitted pulse, and by disabling operation of said counter when a predetermined number of said reflected pulses has been received.

2. Apparatus according to claim 1, wherein said transmitting means emits a laser pulse.

3. Apparatus according to claim 1, wherein said clock pulse generating means further includes:
   an internal clock generator for producing an internal clock signal;
   a signal line for receiving an external clock signal; and
   a multiplexer for selecting either said internal clock signal or said external clock signal in response to a user selected input.

4. Apparatus according to claim 1, wherein said counting means includes:
   a first counter having a carry-out output; and
   at least one additional counter cascaded with said carry-out output of said first counter.

5. Apparatus according to claim 1, wherein said controlling means includes:
   means for enabling said counting means in response to a start count signal command and a stop count signal command; and
   means for generating said stop count signal command in response to said reflected pulses.

6. Apparatus according to claim 5, wherein said stop count signal generating means further includes:
   means for selecting at least one storage location of said shift register as said stop count signal.

7. Apparatus according to claim 6, wherein said selecting means further includes:
   a select counter for selecting a different storage location of said shift register for each of said multiple targets.

8. Apparatus according to claim 7, wherein said selecting means further includes:
   a target counter for determining when ranges to all of said multiple targets have been determined.

9. Apparatus according to claim 5, wherein said stop count signal generating means further includes:
   a noise filter for inhibiting generation of said stop count signal until said counting means counts to a predetermined minimum value.

10. Apparatus according to claim 1, wherein said controlling means further includes:
    a memory for storing a target sequence, said target sequence designating an order in which ranges to each of said multiple targets are determined.

11. Apparatus according to claim 1, wherein said controlling means further includes:
    means for determining when ranges to all of said multiple desired targets have been determined, said controlling means reinitializing said apparatus for another ranging sequence in response to an output of said determining means.

12. Method for determining range to multiple desired targets comprising the steps of:
    transmitting a pulse to said multiple desired targets in a field of view;
    receiving reflected pulses produced from said multiple targets in response to said transmitted pulse; and
    determining a time between said transmitted pulse and any one of said reflected pulses by counting clock pulses, said counting being controlled by clocking a shift register with said reflected pulses produced in response to said transmitted pulse and by disabling said counting when a predetermined number of said reflected pulses has been received.

13. Method according to claim 12, further including the step of:
    inputting a user specified value representing resolution with which target range is determined and the maximum range in which a target will be detected.

14. Method according to claim 13, wherein said user specified value is a clock divide ratio for controlling frequency of a clock input to a range counter.

15. Method according to claim 13, further including the step of:
    inputting a user specified value representing the number of targets to be detected within said maximum range.

16. Method according to claim 12, further including the step of:
    inputting a minimum count value which must be exceeded before said counting is controlled by said monitoring of reflected pulses.

17. Method according to claim 12, further including a step of:
    storing a target sequence, said target sequence designating an order in which ranges to each of said multiple targets are determined.

18. Method according to claim 12, further including the steps of:
    producing an output when ranges to all of said multiple desired targets have been determined; and
    reinitializing said apparatus for another ranging sequence in response to said output.

19. Apparatus for determining ranges to multiple desired targets comprising:
- means for transmitting a pulse to said multiple desired targets in a field of view;
- means for receiving reflected pulses produced by said multiple desired target in response to said transmitted pulse;
- means for selecting one of said multiple targets;
- means for determining a time between transmission of said transmitted pulse and receipt of one of said reflected pulses from said one target selected by said selecting means by clocking a shift register with said reflected pulses produced from said multiple targets in response to said transmitted pulse; and
- means for sequentially determining ranges to said multiple targets in a predetermined sequence, said sequentially determining means further comprising:
  - means for loading a maximum number of said multiple targets whose range is to be determined; and
  - means for determining said predetermined sequence has been completed when said maximum number of targets have been detected.

20. Apparatus according to claim 19, wherein said transmitting means emits a laser pulse.

21. Apparatus according to claim 19, wherein said selecting means further includes:
- a shift register which is clocked by said reflected pulses;
- a select counter for selecting a different storage location of said shift register for each of said multiple targets.

22. Apparatus according to claim 19, wherein said selecting means further includes:
- a noise filter for ignoring said reflected pulses until a predetermined time period is passed following transmission of said pulse.

23. Apparatus according to claim 19, further comprising:
- means for reinitializing said predetermined sequence in response to an indication that said maximum number of targets have been detected.

* * * * *